United States Patent [19]

Wilkinson et al.

[11] Patent Number: 5,196,457
[45] Date of Patent: Mar. 23, 1993

[54] DUAL CURE EPOXY PREPREG CONTAINING UNSATURATED POLYESTER

[75] Inventors: Paul Wilkinson; Arno Montorfano, both of Como, Italy

[73] Assignee: DSM N.V., Heerlen, Netherlands

[21] Appl. No.: 544,545

[22] Filed: Jun. 28, 1990

[30] Foreign Application Priority Data

Jun. 30, 1989 [EP] European Pat. Off. .......... 89830299

[51] Int. Cl.$^5$ .............................................. C08F 2/46
[52] U.S. Cl. .................................. 522/103; 522/13; 522/14; 522/170
[58] Field of Search ................ 522/103, 170, 13, 14

[56] References Cited

U.S. PATENT DOCUMENTS

| | | | |
|---|---|---|---|
| 4,092,443 | 5/1978 | Green | 522/174 |
| 4,203,792 | 5/1980 | Thompson | 437/173 |
| 4,252,593 | 2/1981 | Green | 522/174 |
| 4,666,954 | 5/1987 | Forgò et al. | 522/103 |
| 4,954,304 | 9/1990 | Ohtake et al. | 264/257 |

FOREIGN PATENT DOCUMENTS 0061993 10/1982 European Pat. Off. .

OTHER PUBLICATIONS

Patent Abstract of Japan, Application No. JP-A-5-4-120 675, vol. 3, No. 142 (1979).
Patent Abstract, Application No. JP-A-59 184 618, Database WPIL, Accession No. 84-297684 (Derwent Publications).

Primary Examiner—Marion E. McCamish
Assistant Examiner—Mark A. Chapman
Attorney, Agent, or Firm—Cushman, Darby & Cushman

[57] ABSTRACT

Resin composition, that can be used for manufacturing a prepreg, comprising a liquid epoxy resin, a monomer reactive with the epoxy resin and a hardening catalyst for the epoxy resin, an unsaturated polyester, a monomer reactive with the unsaturated polyester and a hardening catalyst for the unsaturated polyester, whereby the catalyst for the unsaturated polyester is a first catalyst that has a working range below 40° C. and the catalyst for the epoxy resin is a second catalyst that has a working range above 40° C.

9 Claims, No Drawings

DUAL CURE EPOXY PREPREG CONTAINING UNSATURATED POLYESTER

The invention relates to a resin composition, which can be used for manufacturing a prepreg, comprising a liquid epoxy resin, a monomer reactive with the epoxy resin and a hardening catalyst for the epoxy resin, an unsaturated polyester, a monomer reactive with the unsaturated polyester and a hardening catalyst for the unsaturated polyester.

Such a resin composition is disclosed in Japanese patent application No. J-63314232A. Therein such a resin composition is used for wetting an amount of glass fibers, after which a prepreg is formed by heating the glass fiber resin mixture to 40° C. under pressure during 30 hours. The prepreg is then pressed at 160° C., 50 kg/cm$^2$ for 6 min and at 170° C. for 1 hr to give a plate.

A disadvantage of a resin composition as described in Japanese patent application No. J-63314232A is that time-consuming procedures are necessary to produce a useful prepreg from it. It demands pressure, an elevated temperature and a long period of time.

The object of the invention is to provide a resin composition, that can be used for manufacturing a prepreg which does not have said disadvantage.

This object is achieved according to the invention in that the catalyst for the unsaturated polyester is a first catalyst that has a working range below 40° C. and in that the catalyst for the epoxy resin is a second catalyst that has a working range above 40° C.

In U.S. Pat. No. 4,203,792 a thermally curable epoxy containing resin mixture is described, which after shaping and before heating is gellified by polymerizing a radiation curable material. U.S. Pat. No. 4,203,792 does not describe the use of an unsaturated polyester as the radiation curable material and is concerned with a different field of technique.

In FR-A-2.341.613 a process is described for the production of an article from a liquid composition containing an epoxy and fibrous reinforcement, which composition also contains a catalyst which is thermo-activable and a photopolymerisable component with a photoactivable catalyst. The photopolymerisable component is used to thicken the liquid composition. FR-A-2.341.613 does however not describe the use of a polyester as the photopolymerisable component.

In DE-C-1.074.260 a process for the production of the polymerisation product of unsaturated polyester is described, which product contains a.o. an ethylenically unsaturated monomer and an amount of epoxy. DE-C-1.074.260 does however not describe that it is possible to cure the unsaturated polyester and the epoxy at a different stage, and that the mixture is therefor excellently suitable for manufacturing a prepreg. In DE-C-1.074.260 a maleic anhydride is co-reacted with the unsaturated polyester and the ethylenically unsaturated monomer. The epoxy-component is applied to increase the amount of cross-linking in the product by reacting with the carboxy groups of the maleic anhydride.

EP-B-142.463 describes a composition of an epoxy resin and a photopolymerisable compound, which compound is used to thicken the composition. EP-B-142.463 does not describe that this compound can be choosen from the unsaturated polyesters.

Examples of the first catalyst are the photo-curing catalysts and certain members of the group of the peroxide catalysts.

In this way it is possible to cure the unsaturated polyester first, by exposing the composition at room temperature to for example UV-radiation, visible light or any other form of electromagnetic radiation. Other types of catalysis are possible as well. The curing can take place in from 2 to 30 min. The cured polyester forms a network within the epoxy resin, resulting in a composition with visco-elastic properties.

After this the prepreg, which is obtained by thickening of the resin glass fiber mixture through the curing of the polyester, can be stored for several weeks at low temperatures, until it has to be used.

The epoxy resin is cured by heating the prepreg to a temperature above 40° C. and preferably above 80° C. and most preferably to a temperature between 80° C. and 100° C. for at least 1 hour.

Because there is such a broad difference in the temperature ranges at which the two catalysts are applied or have their strongest effect, the second catalyst system will not be activated when activating the first system with only moderate heat or with exposure to light at room temperature. This gives great freedom of action in handling the prepreg afterwards.

By choosing the type and the amount of the unsaturated polyester, the degree of thickening, the tack and the viscoelasticity can be adjusted.

Prior art epoxy resins have been cured by adding a considerable amount (5-10%) of aliphatic amines. This was a problem because of hygiene. To circumvent the use of amines, epoxy resins were cured by adding anhydrides. These anhydrides had the disadvantage that the system cures only at high temperatures and has poor fiber-wetting properties. When heated to these high temperatures, the resin used to drip out of the system. The thickening process according to the invention has the advantage that the thickening is not reversible, that means, that the prepreg keeps its thickened state even at elevated temperatures.

Further unexpected advantages of the invention are that the curing speed is higher, the UV resistance improves, and the electrical and mechanical properties of the epoxy resin are not changed.

The epoxy resin can be chosen from reaction products of epichlorhydrin and/or dichlorhydrin and bisphenol-A, bisphenol-F, 4,4-dihydroxy bisphenyl (generally polynuclear polyhydroxy phenols), chlorinated and/or brominated derivatives of those, novolac and halogenated derivates.

The monomer reactive with the epoxy resin can be chosen from methyltetrahydrophthalic anhydrid (MTHPA) or tetrahydrophthalic anhydrid or phthalic anhydrid and other anhydrides and/or glycols. The monomer can be applied in a ratio compared to the complete epoxy resin of from 10 to 80 % (wt).

The unsaturated polyesters that are applied are preferably alkenically unsaturated cross-linkable polyesters or polymers with terminal acrylate derivate groups, the so-called vinylester polymers. Of course, mixtures of these polymers can be used also. These polymers are preferably used in combination with an alkylenically unsaturated monomer and/or prepolymer.

These polymers preferably have medium or high reactivity so that a high rate of reaction can be realized. The molecular weight per double bond is preferably lower than 800, particularly lower than 400.

Such a polymer preferably has a numeral-average molecular weight of 412-8000, more specifically of 500-6000, most specifically 700-4000.

Such a polymer usually has an acid number of 0–100, preferably of 0–50, specifically of 1–25.

Such a polymer usually has a hydroxyl number of between 0 and 200, preferably between 1 and 100, specifically between 1 and 50. The hydroxyl and acid numbers are defined as mg KOH per gramme polymer according to respectively ASTM E 222-73 and ASTM D 1639-70.

The unsaturated polyesters are mainly synthesized from organic compounds containing carboxyl groups and alcohol groups. Usually diacids and dialcohols are used, however up to 40% (wt) of the two types of difunctional monomers can be replaced by higher-functional monomers and monofunctional monomers and mixtures thereof. Preferably less than 20% (wt) of the two types of difunctional monomers is replaced by a higher-functional monomer.

Preferably at least one ethylenically unsaturated diacid is used. It may be an advantage to terminate the polyester with an unsaturated monocarboxylic acid.

A special class of polyesters is formed by the vinylester polymers. Vinylester polymers are built up from polyols and possibly polyacids, with terminal acrylate groups, methacrylate groups or other acrylates substituted at the $\beta$-site with a $C_2$–$C_4$ alkyl group. The polyols may be OH-terminal polyesters, novolak, phenol, ethers or polyesters or, for instance, half esters or polyols modified with epoxy, isocyanate, polyamine, etc.

The acids that can be applied normally contain fewer than 30 carbon atoms, specifically fewer than 20, more specifically fewer than 10 carbon atoms.

The ethylenically unsaturated diacid is preferably an $\alpha,\beta$-ethylenically unsaturated diacid, for instance a diacid chosen from the group of fumaric acid, maleic acid, chloromaleic acid, itaconic acid, methylglutaric acid, mesaconic acid, citraconic acid or the corresponding esters or anhydrides.

As ethylenically unsaturated mono or triacid can be chosen, for instance, from the group: linoleic acid, or the other unsaturated fatty acids, cinnamic acid, atropic acid, acrylic acid, methacrylic acid, ethacrylic acid, propacrylic acid, crotonic acid, isocrotonic acid or corresponding ester or anhydride derivatives.

Other diacids are preferably saturated aliphatic or saturated-aromatic. Aliphatic and aromatic diacids are chosen, for instance, from the group: succinic acid, glutaric acid, methylglutaric acid, adipic acid, sebacic acid, pimelic acid, phthalic acid, isophthalic acid, terephthalic acid, dihydrophthalic acid, tetrahydrophthalic acid, tetrachlorophthalic acid, 3,6-endomethylene-1,2,3,6-tetrahydrophthalic acid or the corresponding ester or anhydride derivatives.

Aromatic carboxylic acids are used preferably for 5–50% to obtain optimum mechanical properties.

Mono and/or higher-functional aromatic or aliphatic carboxylic acids are chosen, for instance, from the group: benzoic acid, ethylhexanoic acid, mono or trimeric fatty acids, such as stearic acid, acetic acid, propionic acid, pivalic acid, valeric acid, trimellitic acid, 1,2,3,4-butanetetracarboxylic acid, 1,2,4,5-benzenetetracarboxylic acid, 1,4,5,6,-nephthalenetetracarboxylic acid, 1,2,3-propanetricarboxylic acid, 1,2,3-tricarboxylic acid butane, camphoric acid, naphthoic acid, toluic acid or the corresponding ester or anhydride derivatives.

The alcohols that can be used normally contain fewer than 30 carbon atoms, particularly fewer than 20 carbon atoms. Preference is given to the use of saturated aliphatic alcohols or alcohols containing an aromatic group. Ethylenically unsaturated alcohols can be used also. Dialcohols are chosen, for instance, from the group: ethylene glycol, di(ethylene glycol) tri(ethylene glycol), 1,2-propanediol, 1,3-propanediol, 1,2-butanediol, 1,3-butanediol, 1,4-butanediol, 2-methyl-1,3-propanediol, 1,4-pentanediol, 1,4-hexanediol, 1,6-hexanediol, 2,2-dimethyl-propanediol, cyclohexanediol, 2,2-bis-(hydroxycyclohexyl)-propane, 1,2-trimethylolpropanemonoallylether, pinacol, 2,2,4-trimethylpentanediol-1,3,3-methylpentanediol-1,5, with 1-3 equivalents ethylene- or propyleneoxide ethoxylated or propoxylated bisphenol-A and novolak prepolymers possibly partly etherified and ethoxylated. Instead of 1,2-diol, the corresponding oxirane compound can be used.

Mono and higher-functional alcohols are chosen, for instance from the group of methanol, ethanol, 1- or 2-propanol, 1- or 2-butanol, one of the isomers of pentanol, hexanol, octanol, 2-ethylhexanol, fatty alcohols, benzyl alcohols, 1,2-di(allyloxy)-3-propanol, glycerol, 1,2,3-propanetriol; pentaerythritol, tris(hydroxyethyl)isocyanurate and novolak prepolymers, possibly partly etherified and ethoxylated. Instead of 1,2-diol, the corresponding oxirane compound can be used.

It is possible also to choose di and/or higher-functional alcohols having more than 30 carbon atoms. These preferably have a molecular weight lower than 5000, more specifically lower than 2000, but higher than 400. Di-and/or higher-functional alcohols having a molecular weight higher than 400 are chosen, for instance, from the group of polyethylene glycols, polypropylene glycols, addition products of ethylene oxide and/or propylene oxide with bisphenol-A, or phenol-formaldehyde (pre)polymers, preferably epoxidated.

Preference is given to the use of an unsaturated polyester modified with dicyclopentadienyl (DCPD) units. The fact is that this will result in an increase of the glass-transition temperature (Tg) of the resulting article. Preference is given to the use of an unsaturated polyester with 2–45% (wt), more specifically with 20–35% (wt) DCPD. For a further increase of the Tg, the polymer can be modified also with imide groups and/or amide groups. To this end diamines and alcohol amines can be used.

The monomer reactive with the unsaturated polyester preferably is an alkenically unsaturated monomer. The monomer is used in an amount of 10 to 50% (wt) as related to the unsaturated polyester.

Normally the alkylenically unsaturated monomer contains fewer than 50 carbon atoms, preferably fewer than 30, and more specifically fewer than 15, but more than 3 carbon atoms. The monomer is preferably of the vinylaromatic, vinylether, vinylester, acrylate and/or allyl type. More specifically an acrylate compound or vinylaromatic compound is used, because these react quickly during the polymerization reaction.

Vinylaromatic compounds are chosen, for instance, from the group of styrene, $\alpha$-methylstyrene, o-, m-, p-chlorostyrene, t-butylstyrene, divinylbenzene, bromostyrene, vinylnaphthalene, $\alpha$-chlorostyrene and divinylnaphthalene.

Acrylate compounds are chosen, for instance, from the group of methyl, ethyl, propyl, isopropyl, isobutyl, phenyl or benzyl acrylate and methacrylate, 2-ethylhexyl (meth)acrylate, dihydrodicyclopentadiene acrylate, cyclohexyl (meth)acrylate, butanediol (meth)acrylate, (meth)acrylic acid amide, butanediol di-(meth)acrylate, the reaction products of (meth)acrylic acid and phenyl- or cresylglycidyl ethers, propyleneglycol di(-meth)acrylate, diand triethyleneglycol di(meth)acrylate, di- and tripropyleneglycol di(meth)acrylate, hexanediol di(meth)acrylate, trimethylolpropane tri(meth-)acrylate, hexanediol di(meth)acrylate, trimethylolpropane tri(meth)acrylate. Derivatives of acrylates substituted at the $\beta$-site with $C_2-C_4$ can be used also.

Vinylether compounds, vinylester compounds and allyl compounds are chosen, for instance, from the group of allylphthalate, triallylcyanurate, diallylisophthalate, diallylterephthalate, diallylphthalate, ethylhexanoic acid vinylester, vinylacetate, vinylpropionate, vinylpivalate, vinylether, vinylpropylolether, vinylbutylolether and vinylbenzylalcoholethers.

Polyester and epoxy resin can be brought together in a ratio of from 1:99 to 90:10. With preference they are brought together in a ratio of 5:95 to 20:60.

The resin further preferably contains one or more antioxidants, such as hydroxybenzophenone, esters of salycilic acid and hydroxyphenylbenzotriazoles.

Other additives are, for instance, release agents, such as the stearates of zinc, calcium or aluminium, phophates, silicones, polyvinylalcohols and waxes.

The resin further preferably contains one or more inhibitors in amounts of between 0.005-0.2, preferably 0.01-0.1% (wt) calculated on the curable mixture. Known inhibitors that can be used are: hydroquinone, 2,6-dimethylhydroquinone, p-t-butylcatechol, p-benzoquinine, chloranil, 2,6-dimethylquinone, nitrobenzene, m-dinitrobenzene, thio diphenylamine, salts of N-nitro-N-cyclohexylhydroxylamine, 2,3-dichloro-5,6-dicyan-p-benzoquinone, copper naphthenate, 1,2-nepahthoquinone.

The radical polymerization catalysed by the first system can be initiated in many ways as for instance with a chemical initiator system, but also with an electron gun. The chemical initiator system is based on the generation of radicals through thermal, catalytic or photochemical decomposition.

From these, UV or visible-light sensitive catalyst systems (photo-initiator system) or peroxide catalyst system sensitive to low temperatures are eligible.

Preference is given to using a photo-initiator system, because it can bring about controlled and rapid curing at low temperature. Many types of photo-initiator systems can be applied, as described in, for instance, DE-A-1694149, U.S. Pat. No. 3,715,293, EP-A-7086, U.S. Pat. No. 4,071,424, EP-A-185423 and EP-A-97012. Photo-initiator systems are mostly used in amounts of between 0.01-10% (wt), preferably between 0.1-4% (wt).

Preference is given to using a system sensitive to light with a wavelength of 280-800 nm, preferably 360-500 nm and more specifically 360-460 nm.

As the second system preferably a thermally sensitive initiator system is used, normally in amounts of between 0.1 and 5% (wt), which is active at a temperature higher than 40° C.

The second system is preferably chosen from the amines, which preferably have a hydrogen atom in an $\alpha$-position, like tridimethylaminomethylphenol, alpha methylbenzyl dimethylamine, benzyldimethylamine, dimethylaminoethylmethacrylate, dimethylaniline, diethylaniline or dimethylparatoluidine. Other catalysts can be used as well. Furthermore it should be noted, that the amine compounds may have an influence on the first curing reaction as well.

The fiber that is applied is preferably glass fiber.

In order to obtain special effects in respect of the physical properties, the glass fibers may be replaced wholly or partly by carbon fiber, sisal, jute, asbestos, cotton, organic synthetic fibers such as polyamide, polyester, polypropylene or polyethylene, inorganic fibers such as quartz and beryllium and other metal fibers. The fibers may also be present as continuous fibers or in the form of a fiber mat or woven roving kept together by a suitable binding agent, or in the form of chopped continuous filaments without binding agent. The length of the fibers used, notably of the glass fibers, may be between 0.5 mm and 50 mm, but may also be much longer, for instance when they are applied in the form of mats.

The fiber can be added in amounts of up to 85% (wt) (calculated on the total composition).

Preferably the fiber is added in an amount of 10-75% (wt). Besides fibers fillers can be used.

The fillers that may be used are, for instance, mark, antimony trioxide, quartz meal, coconut shell flour, talcum, calcium carbonate, silicon oxide, clay, calcium silicate, wood flour, glass beads, titanium dioxide, aluminium silicate, aluminium hydrate, carbon black or gypsum-anhydrite. The incorporated filler content may be between 0 and more than 80% (wt).

Further, the customary pigments or colourants may be added.

Fillers can be used only when they do not have a significant adverse effect on the catalyst system. A light sensitive catalyst will in most cases be less effective if the compound contains fillers, so when fillers must be used, preference is given to low-temperature sensitive catalysts for the first system.

A prepreg that is manufactured from a resin composition according to the invention can be applied in various ways. It can be applied for example by hand-lay up, or by filament winding. It can also be applied in a moulding press, in vacuum impregnation, in an autoclave or in any other ways in which prepregs are used. The prepreg according to the invention is especially suited for the manufacturing of products with large surfaces, such as boat hulls. The entire body of a boat can not be placed easily in an autoclave or in a press. Thus, on a large mould surface the prepreg can be cured by simply heating the mould surface. No vacuum bag nor autoclave is necessary allthough these can improve quality of the laminate. In hand lay-up it is recommended to apply between layers some methyltetrahydrophthalic anhydride so to reduce air entrapment.

Curing time generally is 8-48 h with curing temperatures generally between 60°-120° C.

A resin composition according to the invention is especially suited for the production of fiber reinforced prepregs used for the production of ships. The traditional composite-ships are made from polyesterglass fiber, while using reactive solvents, such as styrene, with all the accompanying disadvantages for health and environment. Especially styrene emission constitutes a big problem.

Prepregs according to the invention have the advantage that they have better mechanical properties because of the epoxy resin.

A general disadvantage of epoxy resins which are cured with anhydrides is that they develop much heat during curing. This makes it difficult to produce thick pieces of material, since the material will desintegrate during manufacturing.

Surprisingly with a resin composition according to the invention, only a low exotherm peak is observed. When in normal epoxy-anhydride systems a peak of up to more than 300 J/g was seen, the resin composition according to the invention has a peak below 250, and even below 190 J/g. It is advantageous that the exotherm peak is 100-250 J/g and it is more advantageous that it is 170-190.

The low exotherm peak makes it possible to produce parts with a thickness of 0.5 to 300 mm, with preference 1 to 200 mm, and most preferably 2-200 mm. Such a part has a weight of more than 4000 g/m$^2$, and by preference it has a weight of 1500-3000 g/m$^2$.

Leaking of components of the resin system out of the prepreg during processing, e.g. during application against vertical walls of the ship is prevented by the viscoelastic properties of the prepreg. This phenomenon is called starvation.

A prepreg according to our invention is especially suited for use in making large structures of sandwichlike material, as is described e.g. in European Patent Application No. 89200646.1. In this application it is described that prepregs are used to envelop inflatable bags, which bags are placed between two layers which are to form the top and bottom of the sandwich structure. The layers can be made of the same prepreg material. The bags are inflated and the prepregs are cured. This curing can take place together with the curing of the two layers. After curing the bags can be removed or can remain on place. The result is a sandwich structure with hollow spaces in between.

With a prepreg according to our invention it is possible to produce complete ship-hulls in one piece, including reinforcement ribs, which can be prepared from inflated prepreg enveloped pipes and which can be cured together with the wall.

The advantages of the prepreg are the fact that the prepreg does not starve, the fact that the prepreg does not produce environmentally unwanted gasses, the fact that the prepreg does not develop much heat during curing and therefor can be applied in thick pieces in one time, and the fact that the prepreg can simply be cured by applying heat without pressure.

Another advantage is, that the prepreg is completely compatible with a 2 component resin formulation e.g. as mentioned in experiment V. This resin can be used as standard hand lay-up resin for making details.

EXPERIMENTS

EXAMPLE I

The resin composition was composed as follows:

| | |
|---|---|
| 500 parts diglycidilether of bisphenol-A | |
| 500 parts methyltetrahydrophthalic anhydride | |
| 250 parts polyester resin with the following composition: | |
| diethyleneglycol | 180.8 parts |
| monopropyleneglycol | 225.4 parts |
| dipropyleneglycol | 40.2 parts |
| phthalic anhydride | 331.8 parts |
| maleic anhydride | 221.8 parts |
| 100 parts styrene | |
| 10 parts of benzyldimethylamine | |
| 3 parts dimethylaminoethylmethacrylate | |
| 1.4 parts 1,2-diphenylethanedione. | |

All components are mixed in a vessel with stirrer.

At room temperature a resin layer of 1000 g/m$^2$ was applied onto a thermoplastic film which advanced with a controlled speed of 1 m/min. Above this layer of resin a combined glass mat/roving of 1300 g/m$^2$ was applied.

A second thermoplastic film with a second resin layer with the same weight per square meter was applied on top of it after degassing had occurred. The sheet was passed through an impregnating zone. After the impregnating zone the sheetlike product was thickened by exposing it to visible light through which the polyester hardened. A 420 nm fluorescent lamp was used with a power of 2000 W/m$^2$ during 8 min. The hardening process took place at room temperature. Higher temperatures can be applied to enhance the thickening process, but then the sheet has to be cooled before it is rolled up to prevent epoxy polymerization.

The produced sheetlike prepreg, covered on both sides with a thermoplastic foil, can be rolled up and stored for several weeks at low temperature. After the thickening, no resin leaked out of the prepreg, not even when it was placed in a vertical position, and heated to 80° C.

For application of the prepreg the thermoplastic films were removed, the prepregs were placed as wished and the epoxy resin was cured at a temperature of 80° C.

The mechanical properties are indicated in table 1. They are measured after a curing time of 48 h, 65° C. on the prepregs of example I.

TABLE 1

| | Mechanical properties |
|---|---|
| Curing cycle, | 48 h, 65° C. |
| reinforcements (% wt glass) | 55 |
| Tensile load ASTM D638 (MPas) | |
| Tensile Modulus ASTM D638 (MPas) | 250.000 |
| Flexural modulus ASTM D790 (MPas) | 17.000 |
| Flexural strength ASTM D790 (MPas) | 450 |
| Delamination BSI 341 A (MPas) | 38 |

EXAMPLE II

To a resin composition with the same contents as in Example I an amount of 0.15% (wt) of benzoyl peroxide was added. It was observed that the thickening speed increased by a factor of 5.

EXAMPLE III

A resin composition is used like mentioned in example I in which dimethylaminoethylmethacrylate is substituted by 3 parts of diethyl N,N-bis(2-hydroxyethyl-)aminomethylphosphonate and 1,2 diphenylethanedione is substituted by 2 parts of camphorquinone.

This formulation was thickened with light like in example I.

EXAMPLE IV

A resin composition is used like the one mentioned in example I in which the dione and the acrylate is substituted by benzoylperoxide (0.4%) and N,N-bis-2-hydroxyethyl-p-toluene (1%); The thickening occured at 30° C. within 15 min gel time can be regulated with parabenzoquinone.

EXAMPLE V

The following formulation was used:

| Component A: | |
|---|---|
| diglycidilether or bisphenol A | 49 parts |
| methyltetrahphthalic anhydride | 48.7 parts |
| benzoyl peroxide (50%) | 1 part |

-continued

| | |
|---|---|
| fumed silica | 1 part |
| tixotropy enhancer | 0.3 part |
| dibutylmaleate (as viscosity reducers) | 3 parts |
| Component B: | |
| polyester resin in styrene (as previously decribed) | 90 parts |
| styrene or dibutyl maleate | 4.5 parts |
| N,N benzyldimethylamine | 4 parts |
| N,N-bis-2-hydroxyethyl-p-toluidine | 1.5 parts |
| inhibitors (quinones) | 0.05 parts |

A and B where mixed in a ratio 4:1. The mixed components were used for normal hand lay-up applications or for the production of prepreg. Gelification occurs within 30 minutes at 25° C. The gelled resin hardenes at 65° C. or higher. This formulation can be used for making details and other parts difficult to make with prepreg technology. This formulation is compatible with the ones described in examples I, II, III and IV.

We claim:

1. Resin composition, that can be used for manufacturing a storage stable prepreg, which said prepreg has a thickness between 2-200 mm, comprising a liquid epoxy resin, a monomer reactive with the epoxy resin, an unsaturated polyester, a monomer reactive with the unsaturated polyester and a hardening catalyst for the unsaturated polyester, characterized in that the catalyst for the unsaturated polyester is a first catalyst that has a working range below 40° C. and the catalyst for the epoxy resin is a second catalyst that has a working range above 40° C. and that the unsaturated polyester and the epoxy resin are mixed in the ratio 99:1 to 10:90.

2. Resin composition according to claim 1, characterized in that the first catalyst is chosen from the group consisting of photocatalysts and peroxide catalysts.

3. Resin composition according to claim 2, characterized in that the first catalyst is a light sensitive-catalyst and in that the polyester can be hardened by exposing the composition to a light with a wave length of 280-800 nm during 5 to 30 min.

4. Resin composition according to claim 1 characterized in that the second catalyst is an amine.

5. Resin composition according to claim 1 characterized in that the unsaturated polyester and the epoxy resin are mixed in a ratio of 5:95 to 30:70.

6. Prepreg, obtainable by wetting fibers with a resin composition according to claim 1 during the polyester resin at least partly.

7. Product obtainable by curing a prepreg as described in claim 6.

8. Product, obtainable by curing the unsaturated polyester of a resin composition as described in claim 1 by initiating the first catalyst and by curing the epoxy resin by heating the composition to a temperature higher than 40° C.

9. Product, obtainable by curing the unsaturated polyester of a resin composition as described in claim 1 by initiating the first catalyst and by curing the epoxy resin by heating the composition to a temperature higher than 70° C.

* * * * *